United States Patent [19]
Kurtz et al.

[11] Patent Number: 5,923,475
[45] Date of Patent: Jul. 13, 1999

[54] LASER PRINTER USING A FLY'S EYE INTEGRATOR

[75] Inventors: Andrew F. Kurtz; David Kessler, both of Rochester, N.Y.

[73] Assignee: Eastman Kodak Company, Rochester, N.Y.

[21] Appl. No.: 08/757,889

[22] Filed: Nov. 27, 1996

[51] Int. Cl.$^6$ .................................................. G02B 27/10
[52] U.S. Cl. .......................... 359/619; 359/621; 359/626
[58] Field of Search ...................... 359/619, 621, 359/626

[56] References Cited

U.S. PATENT DOCUMENTS

| | | | |
|---|---|---|---|
| 3,944,323 | 3/1976 | Starkweather | 350/7 |
| 4,040,096 | 8/1977 | Starkweather | 358/302 |
| 4,247,160 | 1/1981 | Brueggemann | 350/6.8 |
| 4,497,015 | 1/1985 | Konno et al. | 362/268 |
| 4,578,689 | 3/1986 | Spener et al. | 346/160 |
| 4,651,169 | 3/1987 | Muka | 346/108 |
| 4,651,170 | 3/1987 | Chandler et al. | 346/108 |
| 4,734,715 | 3/1988 | Shiraishi | 346/108 |
| 4,804,975 | 2/1989 | Yip | 346/76 |
| 4,911,526 | 3/1990 | Hsu et al. | 350/96.24 |
| 4,939,630 | 7/1990 | Kikuchi et al. | 362/268 |
| 4,953,036 | 8/1990 | Yoshimura | 358/400 |
| 5,098,184 | 3/1992 | van den Brandt et al. | 353/102 |
| 5,239,313 | 8/1993 | Marko et al. | 346/108 |
| 5,255,115 | 10/1993 | Kikuchi | 359/209 |
| 5,274,492 | 12/1993 | Razzaghi | 359/202 |
| 5,289,001 | 2/1994 | Arimoto et al. | 250/236 |
| 5,418,583 | 5/1995 | Masumoto | 353/38 |
| 5,517,359 | 5/1996 | Gelbart | 359/623 |
| 5,521,748 | 5/1996 | Sarraf | 359/321 |
| 5,659,349 | 8/1997 | Albano et al. | 347/260 |
| 5,699,191 | 12/1997 | Fork | 359/626 |
| 5,745,153 | 4/1998 | Kessler et al. | 347/241 |
| 5,754,278 | 5/1998 | Kurtz | 355/67 |

Primary Examiner—Georgia Epps
Assistant Examiner—Suzanne Letendre
Attorney, Agent, or Firm—Nelson Adrian Blish; David A. Novais

[57] ABSTRACT

A laser printer (10) is comprised of a laser diode array (11), a cross array illumination optics (21), a laser lenslet array (24), a spatial light modulator (40), and a fly's eye integrator (23) which illuminates the spatial light modulator with flooded uniform light.

In another embodiment the angular spectrum of the light incident to the spatial light modulator is tailored to enhance the quality of modulation. The spatial light modulator (40), is illuminated uniformly by laser diode emitters (12) comprising laser diode array (11), and the spatial light modulator (40) break up the light into image elements, which are subsequently imaged to a media plane (60), to form a desired pattern of spots.

17 Claims, 7 Drawing Sheets

LASER PRINTER USING A FLY'S EYE INTEGRATOR

BACKGROUND OF THESE INVENTION

1. Field of the Invention

The present invention relates to laser printers in general, and in particular, to a laser printer with a laser diode array source, a spatial light modulator, a laser lenslet array, and a fly's eye integrator assembly.

2. Description of the Prior Art

In a typical laser printer, radiation from a laser is shaped, and imaged onto a film plane to produce a desired spot size. The spot, called a pixel, forms the smallest element of the image. The laser radiation is modulated to create the correct density of each spot, pixel by pixel. The laser spot is scanned in the line direction, and the media is moved in the page direction to create a two dimensional image.

In a printer system with a continuous wave (CW) gas or solid state laser, an external modulator, such as an acousto-optical device, is used to input the image data into the optical beam. For systems with semi-conductor diode lasers, the laser radiation is typically modulated directly by varying the current input to the laser. For printers using high sensitivity media such as silver halide, high throughput is obtained by scanning the laser beam in the line direction with a polygonal mirror or a galvanometer. These printers are called "flying spot" printers.

For a low sensitivity media printer, such as a laser thermal printer, higher power laser sources and slow line and page scan speeds are used to meet the high exposure requirements, which are typically 0.2–0.5 joules/cm$^2$. One way to achieve this type of scan is to configure the printer like a "lathe", where the page scan is obtained by rotating a drum which holds the film, and line scan, by translating the laser in a direction parallel to the axis of rotation of the drum.

To achieve this high optical power throughput in a small package with a relatively low cost, many discrete lasers are ganged together to form multiple spots on the film plane. Multiple spots, or pixels, written simultaneously, increase the throughput, and multiple laser sources provide the required optical energy. There are several approaches for bringing a multitude of laser sources together in a laser printer, including a system wherein the laser sources are separately coupled to optical fibers, which are then mounted together to form a linear array of sources. Such a system is described in U.S. Pat. No. 4,911,526.

Another approach is to utilize a monolithic array of laser sources, and then image the elements of the laser array directly onto the light sensitive media to produce multiple spots. Power to each element of the laser array is individually modulated to obtain pixel densities. Such a system, described by U.S. Pat. No. 4,804,975, is potentially of lower cost and higher efficiency compared to systems which couple the lasers to optical fibers. However, such monolithic laser diode arrays have their own disadvantages. When the individual lasing elements are imaged directly to the media, failure of even one element in the array introduces a pattern error. Also, the electronics to modulate high current inputs to the diodes at high speeds are expensive and difficult to manufacture. Furthermore, the system is also sensitive to image artifacts caused by thermal and electrical crosstalk effects within the diode laser array package.

One approach to improving a system with a monolithic diode array source is to split each lasing element into an array of subarray laser sources. Systems employing such lasers are described in U.S. patent application Ser. No. 07/986,207, filed Dec. 7, 1992, U.S. Pat. No. 5,795,153 and Ser. No. 08/283,003, filed Jul. 29, 1994 5,613,245 to the same assignee as the present invention. Each writing pixel is assembled from the combined light of all the lasing elements of a given subarray, and each of the subarrays are directly and individually modulated to provide the image data input. This approach helps to reduce the sensitivity to thermal crosstalk and as well desensitizing the system to failure of lasing elements within a subarray.

Another approach to improving a system with a monolithic diode array sources is to combine the light from each lasing element to flood illuminate a spatial light modulator. The elements of the modulator break up the light into image elements, and each element of the modulator is subsequently imaged onto the media plane to form the desired array of printing spots. Systems employing this approach are described in U.S. Pat. Nos. 5,517,359 and 5,521,748. These systems improve upon the prior art designs by providing indirect light modulation means, so that the laser diode array source operates at full power, and serves only as a light source. The systems described in these patents have a disadvantage in that the illumination provided to the modulator plane may be substantially non-uniform. In both cases, the emitting elements are imaged directly onto the modulator at a high magnification. As the array direction light emission profiles have both macro- and micro-nonuniformities, the resulting modulator illumination may be significantly non-uniform. U.S. Pat. No. 5,517,359 includes a mirror system which partially compensates for these problems by substantially removing the macro-nonuniformities, but at the cost of some reduced brightness due to the increased angular spread of illumination to the modulator. Also, this uniformization method only works well when the light profile across the emitting elements already has large areas which are substantially uniform.

There are numerous methods available for improving the illumination uniformity of optical systems, such as with diusers and integrating cavities. However, most of these methods substantially reduce the brightness of the light conducted through the entire optical system. The optical systems designed for photolithographic printing in the manufacture of a semiconductor element, such as for an IC chip, have made extensive use of integrators which substantially preserve the brightness while providing uniform illumination. In particular, fly's eye lenslet array systems have been used in many systems, such as that described by U.S. Pat. No. 4,497,015, Konno et al., which utilizes an arc lamp source, the light output of which is carefully homogenized before it arrives at the mask plane. Another patent, U.S. Pat. No. 4,939,630, describes a similar photolithographic illumination system, which utilizes a laser, such as an excimer or YAG laser, as the source. These light sources, the arc lamp, excimer laser, and YAG laser, are large, spatially continuous sources, which emit beams of substantial size. By comparison, a laser diode array is a segmented source, which consists of a series of small, distinct emitting sources, substantially separated from each other spatially.

SUMMARY OF THE INVENTION

It is an object of this invention to provide an illumination system for a laser printer utilizing flood illumination of a spatial light modulator which overcomes the problems of macro- and micro- nonuniformity of the light emitted from the lasing elements, while substantially preserving the brightness within the optical system.

Another object of this invention is to provide an illumination system for a laser printer utilizing a laser diode array, which has fewer components and a reduced size compared to prior art systems.

Still another object is to provide an illumination system for a laser printer utilizing a laser diode array, wherein the angular spectrum of the light incident to the spatial light modulator can be tailored to enhance the quality of modulation.

These and other objects are accomplished in the present invention wherein a laser printer is comprised of a laser diode array, which provides an illumination source, a laser lenslet array, a fly's eye integrator system and other optical elements to illuminate a modulator array in the form of a spatial light modulator in a fashion that is substantially homogenized both angularly and spatially. The spatial light modulator, a reflective or transmissive device, is illuminated uniformly by all elements of the laser. The elements of the spatila light modulator break up the light into image elements, which are imaged to a media plane, to form a pattern of spots.

DETAILED DESCRIPTION OF THE INVENTION

Figure 1:
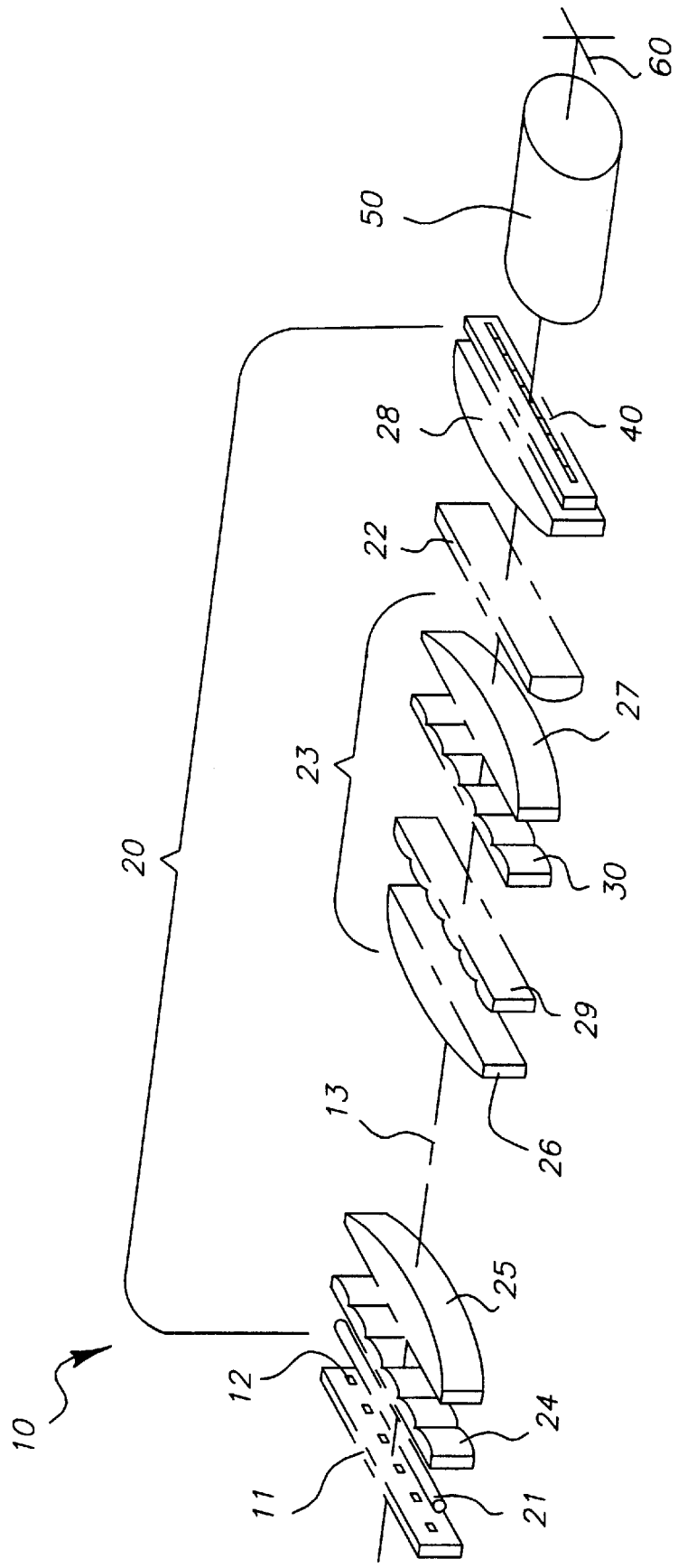
FIG. 1 is a perspective view of a laser printer according to the present invention.

A preferred embodiment of the present invention for a laser printer is shown in the context of a laser printer, referred to in general by numeral 10 in FIG. 1. The laser printer is comprised of a laser diode array 11, illumination optics 20, a spatial light modulator 40, print lens 50, and a receiver, located at a media plane 60.

Laser diode array 11 is a high power array of laser diode emitters 12. The emitters 12 of the array are each activated simultaneously using a common power supply (not shown) in a CW (Continuous Wave) manner. The use of a CW laser without individual modulation simplifies the power supply and the heat dissipation system.

All laser diode emitters 12 of the laser diode array 11, in combination with the illumination optics 20, illuminate a line or area of a specified size at the spatial light modulator 40. In particular, the light from each lasing element is mapped by illumination optics 20 to cover the full width of the spatial light modulator 40, thereby providing source redundancy, and reducing the sensitivity of the system to the malfunction of any one laser diode emitter 12.

The illumination optics 20 are shown as anamorphic, meaning there are separate optical systems designed for the array and cross array directions, as the light output by the laser diode emitters has vastly different characteristics in the two directions. It should be understood that some axially symmetrical components, with power in both directions, could also be used. The cross array elements consist of the fiber lens 21 and cross array lens 22, as well as components (not shown) for correcting cross array smile error. In general, these cross array elements are designed to confine the light within the vertical width of the modulator, while minimizing the cross array numerical aperture (NA). This can be accomplished by imaging the laser diode emitters 12 to the spatial light modulator 40. Alternatively, the fiber lens 21, or its back focal plane, can be imaged to the modulator. These latter configurations assist in desensitizing the system to smile error.

The illumination optics 20 also includes many other elements, such as a laser lenslet array 24, a combiner field lens 25, a fly's eye integrator 23, and a field lens 28, all of which are shown as cylindrical elements. The fly's eye integrator 23 consists of first uniformizer lenslet array 29, second uniformizer lenslet array 30, and field lenses 26 and 27. In general, the array direction optics are designed to provide uniform illumination of the modulator by dividing the light from each laser diode emitter 12 into multiple portions, and then overlapping all of these portions over the full length of the spatial light modulator 40. Working together, the array and cross array optics flood illuminate the modulator with a long, narrow, line of light of uniform radiance, while largely preserving the brightness of the laser diode array source (less transmission and other losses), and providing redundancy relative to the emitters. In particular, the line of illumination extends the full length of the modulator in the array direction, while illuminating a narrow width in the cross array direction, roughly equivalent to the width of the sites of the spatial light modulator 40.

The illuminated modulator is imaged to the media plane 60 by a print lens 50 to create a line of closely packed writing spots. The print lens 50 is typically a multi-element assembly, which may either be axially symmetric or anamorphic. Depending on the type of light modulator 40 used, additional optical elements may be included in the print lens elements as part of the modulation process. For example, for light polarization modulators, such as PLZT or liquid crystal devices, a polarization analyzer, such as a beamsplitting cube, would be located downstream of the modulator. As another example, for diffractive phase altering modulators, the optical system beyond the modulator would be a schlieren system. In that case, a stop structure could be located within the print lens assembly to phase discriminate the modulated and unmodulated light at a fourier plane.

The system of FIG. 1 utilizes a fly's eye integrator 23 to improve the illumination uniformity, very much as is classically done in photolithography systems, except that the fly's eye integrator is further adapted to work with a segmented source, such as laser diode array 11. Konno, U.S. Pat. No. 4,497,015, illustrates an illumination design for photolithography, which incorporates fly's eye integrator. In that system, a first fly's eye stage, which includes two lenslet arrays a focal length apart, is used to break the beam up from the arc lamp source into many smaller beams. The second lenslet of the pair, in combination with a field lens, images the beams from the corresponding first lenslets in overlapping fashion to an intermediate image plane. The process is then repeated with a second stage fly's eye integrator assembly to improve the uniformity further. A system described in Kikuchi, U.S. Pat. No. 4,939,630 is similar to that of Konno, except that it is adapted to work with the large, nearly collimated beam from an excimer laser. In this case, the first stage uniformizer is simplified to have a single lenslet array, which breaks the large beam into subportions which are then overlapped. A second stage uniformizer, with a pair of lenslet arrays and field lenses, then follows, in similar fashion to Konno.

The FIG. 1 system is similar in concept to those of Konno and Kikuchi, except that the source, laser diode array 11, is already segmented into many emitter areas. The light from these emitters can be combined in overlapping fashion without having to subsanmple the emitters into many smaller beams. In this case, laser lenslet array 24 and combiner field lens 25 create an intermediate illumination plane, which is then input into the fly's eye integrator 23. At this intermediate illumination plane, the light profile is typically more uniform, but the integration is incomplete. All points within the illuminated area may not see light from all points of the source, or all points within the area may not see the full angular range of incident light. The fly's eye integrator 23 is used to further improve the uniformity. The light incident to the first uniformizer lenslet array 29 comprises a secondary source at the intermediate illumination plane, which will be imaged by the fly's eye integrator 23.

In FIG. 1, the fly's eye integrator 23 includes a first plurality of lenslets (those of first uniformizer lenslet array 29), arranged parallel to the optical axis 13, for subsampling the intermediate illumination plane input to the fly's eye integrator 23. These lenslets (of first uniformizer lenslet array 29) form a plurality of images of laser lenslet array 24 onto a first focal plane. The fly's eye integrator 23 then includes a second plurality of lenslets (second uniformizer lenslet array 30) located in the vicinity of this first focal plane, and corresponding respectively to the first plurality of lenslets, which in turn, working with field lens 27, form images of the first plurality of lenslets (first uniformizer lens let array 29) at a second focal plane. The fly's eye integrator includes a field lens 27 which causes this plurality of images at the second focal plane to be overlapped onto each other in a centered fashion. The fly's eye integrator 23 may also include an input field lens 26 to alter the input light to be telecentric into the assembly.

Figure 2:
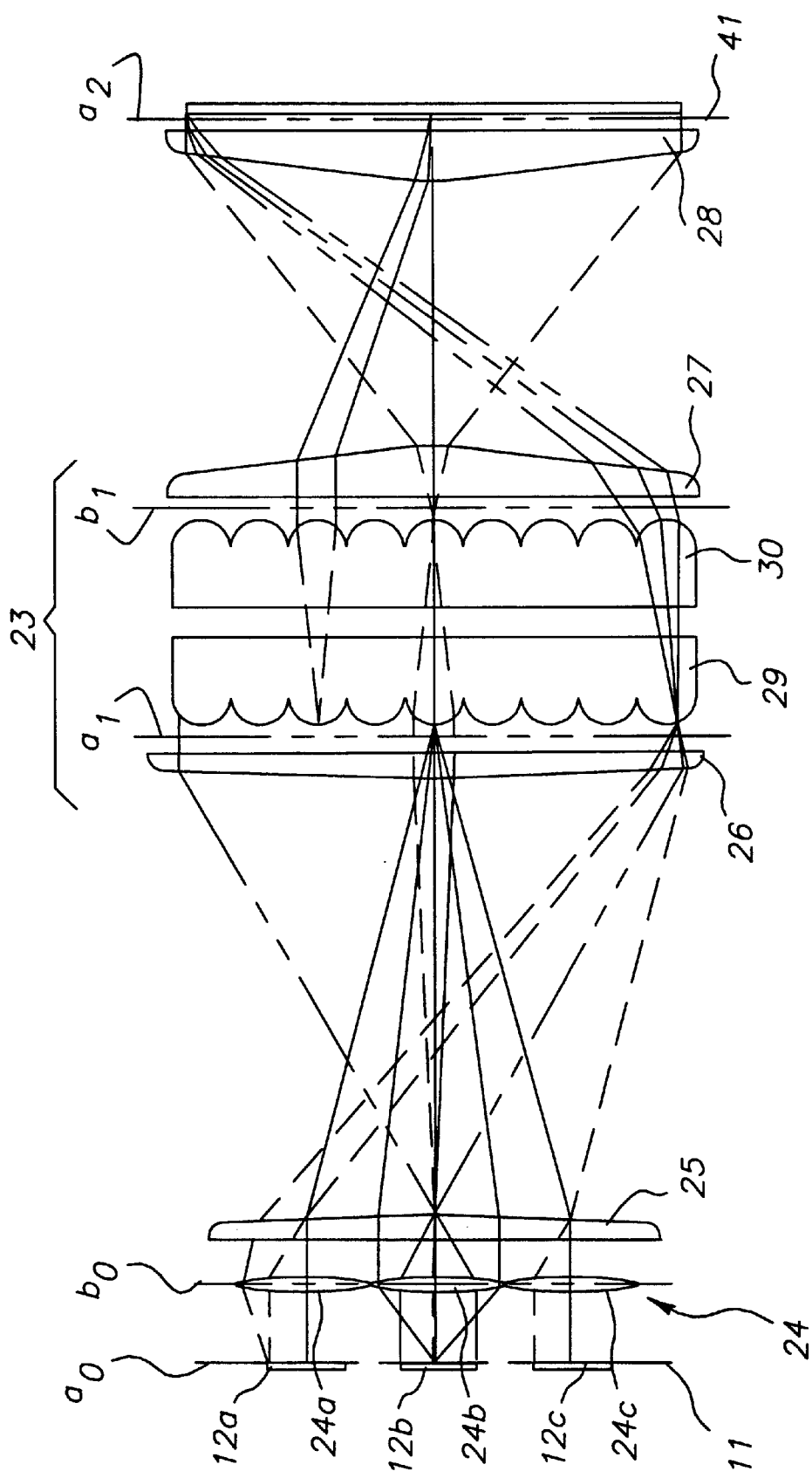
FIG. 2 is a top plan view of a portion of the invention shown in FIG. 1, showing additional details of the optics arrangement, and particularly the optics layout prior to the modulator.

Referring now to FIG. 2, the preferred embodiment for providing modulator illumination will be discussed in greater detail. The laser diode array 11 at plane $a_0$ is spatially segmented into $N_1$ sources, which are typically large area multimode laser diode emitters. In high power diode laser arrays, these laser diode emitters 12 are not closely packed, so as to minimize thermal crosstalk effects. Thus the active areas of the laser diode emitters are separated, and each occupies a fraction of the array length. The light from each laser diode emitter 12 is not temporally or spatially coherent with light from any other laser diode emitter, so the light can be superimposed without inducing interference effects that would degrade illumination uniformity. Furthermore, the light is generally incoherent across the laser diode emitters themselves, except in very localized areas, so the light from a given laser diode emitter can be broken up and overlapped, again without significant interference effects. Optically, these laser diode emitters can be regarded as miniature extended sources, as opposed to being the point light sources that many lasers approximate.

Figure 5:
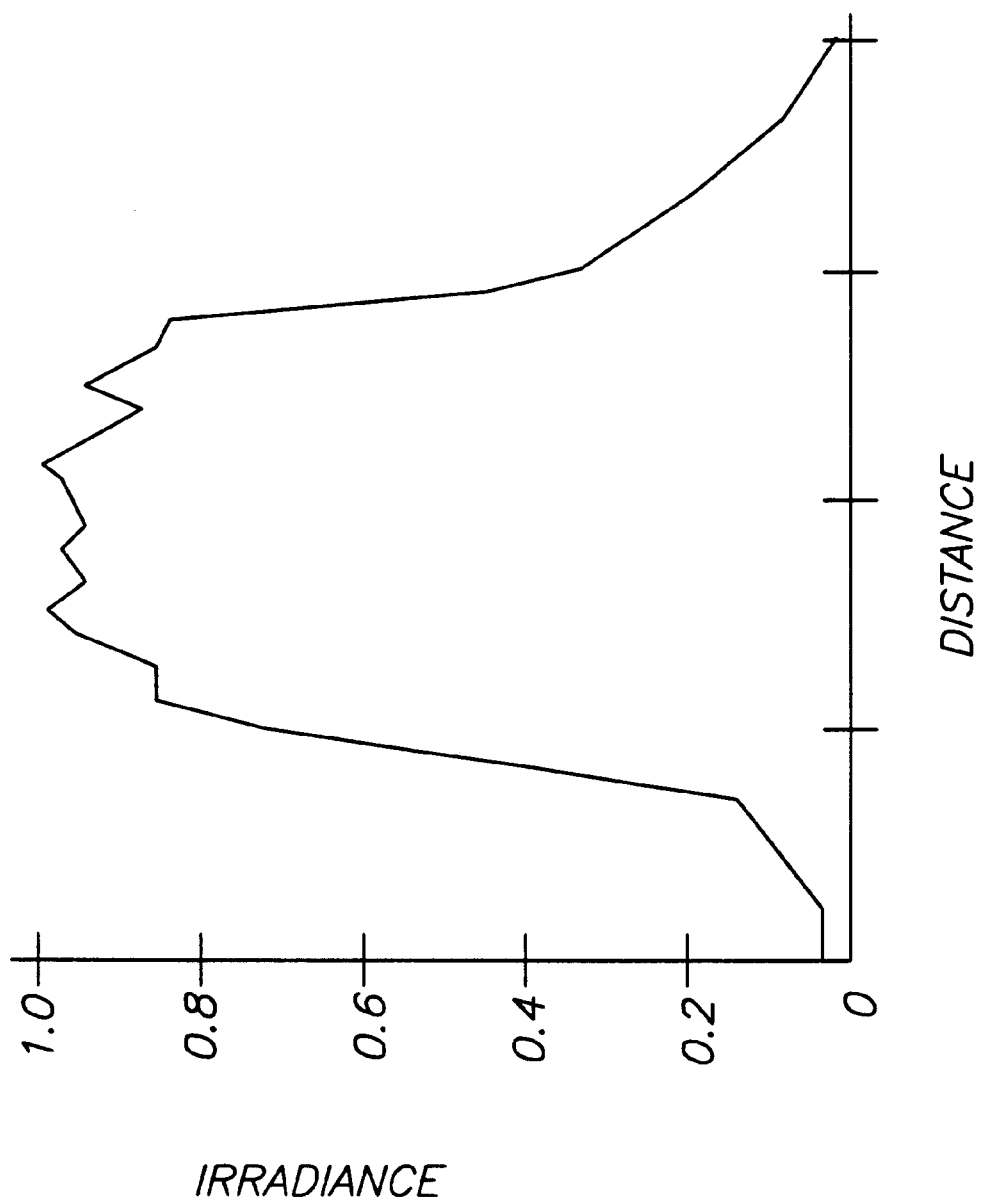
FIG. 5 is a plot illustrating the near field spatial light profile typical to a multimode laser diode array emitter.

When each of these laser diode emitters is imaged in overlapping fashion to the intermediate illumination plane $a_1$ of FIG. 2, the incident light at $a_1$ is only partially mixed. The light from the various laser diode emitters has been overlapped, but the laser diode emitters have not been subsampled and mixed angularly or spatially. For example, light from the n-axis points of each laser diode emitter will collect at the center of the $a_1$ plane, and light from the off-axis points of each laser diode emitter will collect at the off-axis points of the $a_1$ illuminated area. The raypaths drawn from the various laser diode emitters 12a, 12b and 12c illustrate this. As a result, any systematic problems in the light profile across the laser diode emitters, such as the edge roll-off, shown in FIG. 5, are not removed. Thus, a second stage of integration, is provided by fly's eye integrator 23. Fly's eye integrator 23, which consists of field lenses 26 and 27, and the uniformizer lenslet arrays 29, 30, is incorporated in the optics system to subsample the laser diode emitters, and more completely mix the light from them both angularly and spatially.

Referring again to FIG. 2, planes $a_0$, $a_1$, and $a_2$ are conjugate to each other. Planes $b_0$ and $b_1$ are also conjugate to each other. The laser lenslet array 24 consists of $N_1$ lens elements, with each lens element corresponding to a given laser diode emitter 12 of the laser diode array 11. Each lenslet element $24_a$, $24_b$, and $24_c$ works in combination with the combiner field lens 25 to image a laser diode emitter at high magnification onto the input face of the first uniformizer lenslet array 29 at plane $a_1$. For example, an on-axis case is illustrated by the raypaths drawn from laser diode emitter 12b, through lenslet element 24b and lens 25 to the first uniformizer lenslet array 29. Two off-axis imaging cases are illustrated by raypaths from laser diode emitter 12a through lenslet element 24a and lens 25, as well as from laser diode emitter 12c through lenslet element 24c and lens 25. Field lens 26 alters the incoming light to be telecentric to the first uniformizer lenslet array 29 at plane $a_1$.

The light at the intermediate illumination plane $a_1$ is broken into $N_2$ portions, where $N_2$ is the number of lenslet elements in each of the uniformizer lenslet arrays 29,30. The corresponding lenslet elements in the second uniformizer lenslet array 30 work together with the field lens 27 to image the lenslet elements of the first uniformizer lenslet array 29 in a magnified and overlapping fashion onto the $a_2$ plane (also referred to as the modulator plane 41). The field lens 28 operates in a similar fashion as lens 26, to make the input light telecentic to the $a_2$ illumination plane. Thus localized non-uniformity's in the light distribution at the $a_1$ plane are magnified spatially and spread across much of the $a_2$ illumination plane. When the portions of the $a_1$ plane subsampled by the $N_2$ uniformizer lenslets of arrays 29, 30 are combined in this way, the net effect is to average out the local non-uniformity's to create a much more uniform radiance distribution of the light. Obviously, the more $N_2$ lenslet pairs that are used in the fly's eye integrator 23, the better the averaging. If the obtained uniformity is still inadequate, further integrator stages, with lenslet array pairs and field lenses can be added to the system after the illumination plane $a_2$.

By way of example, a typical laser diode array such as the Optopower OPC-D020 laser (Opto Power Corporation, Tucson, Az.), is a 20 Watt laser consisting of 19 diode laser elements, each 150 $\mu$m wide, and spaced apart on a 650 $\mu$m pitch, for an overall array length of 11.85 mm. This laser array emits linearly polarized light at 830 nm, with an array NA of 0.13. For a system design wherein the laser lenslet array 24 collimates the light from the laser diode emitters, the focal length of the lenslet elements is then 2.47 mm. Each of the uniformizer lenslet arrays 29 and 30 consists of 6 lenslet elements, with 1 mm array direction lenslet widths. The combiner field lens 25 then has a focal length of 99 m, so that the 6 mm width of array 29 is filled with light. Then, the lenslet elements of the uniformizer lenslet arrays 29, 30 have 8.0 mm focal lengths, which ensures that the output faces of the lenslets at the $b_1$ plane are filled with light as well. For a spatial light modulator 40 consisting of 256 pixels, each 60 μm wide, the focal length of field lens 27 is 123 mm, so that the appropriate magnification is provided to illuminate the fill length of the modulator. Field lens 28 then has the same 123 μm focal length. The illumination system from laser to modulator has an overall length of about 240 mm.

Figure 3:
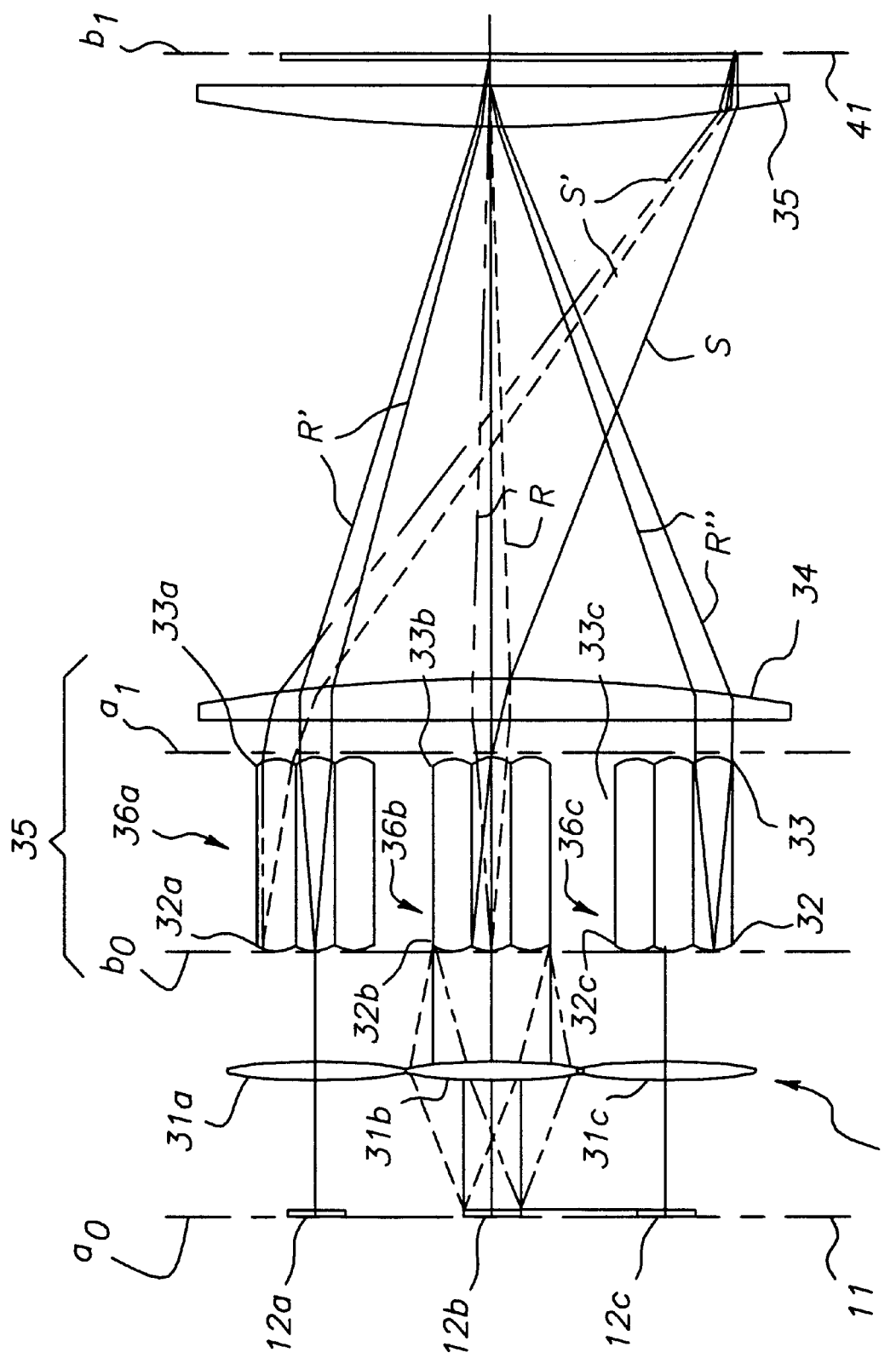
FIG. 3 is a top plan view of an alterative embodiment of the invention, showing details of the laser lenslet array and the uniformizer lenslet arrays.

It is to be understood that this system is described in terms of the principal functions of the various components and that variations are possible which might alter or improve the performance. For example the laser lenslet array and uniformizer lenslet arrays are depicted as cylindrical refractive components, but they might be diffractive, or have a spherical or aspherical lensing profiles. The uniformizer lenslet arrays can be constructed as two separate elements, as shown in FIGS. 1 and 2, or as a solid optical element, with power surfaces on both sides of one piece, as shown in FIG. 3.

The laser lenslet array 24 shown in FIG. 2 is designed to work at infinite conjugates, so as to collimate the light from the laser diode emitters. The field lens 25 completes the imaging and overlapping. It is also possible to construct the laser lenslet array 24 of FIG. 2 to directly provide the finite conjugate imaging. Accordingly, one method is to have the lenslet elements offset in the array direction from the laser diode emitters. Effectively, the lenslet elements are made to a slightly smaller pitch than the laser diode array itself. As a result, the light passing through the laser lenslet array is shifted from the optical axes of the respective lenslets. The images of the laser diode emitters are overlapped at the $a_1$ plane of FIG. 2 as if the field lens 25 were present, so that lens 25 is not actually needed. In yet another alternate method, the lenslets of laser lenslet array 24 can be made to the same pitch as the laser diode array 11, but the optical axes of the lenslets of laser lenslet array 24 are shifted. The lenslets of laser lenslet array 24 retain their full apertures, so that the maximal light is collected, while the effective power of the lenslets is altered. For example, with refractive lenslets, the lenslet shapes would be constructed as off axis arcuate sections. This alternate method also allows the field lens 25 to be eliminated, as its function is incorporated into the laser lenslet array 24.

In a similar fashion, the uniformizer lenslet arrays 29 and 30 can also be constructed with multifunctionality. Specifically, the lenslets of first uniformizer lenslet array 29 can be designed to include the functions of field lens 26, so that lens 26 can be eliminated. The telecentricity function of the field lens can be provided by constructing the lenslets of first uniformizer lenslet array 29 as off-axis arcuate sections. The imaging function of the field lens can be provided by designing the lenslet elements to work at finite conjugates. Then the distance between the uniformizer lenslet arrays 29 and 30 is no longer one focal length, but the appropriate (and larger) distance required for proper imaging. While this design approach does reduce the part count, it adds significant complexity to the design of the first uniformizer lenslet array 29, as the lenslet elements no longer have identical properties, but vary across the array. Similarly, the second uniformizer lenslet array 30 could be designed to incorporate the imaging and telecentricity properties of the field lens 27.

The illumination system is also adaptable to the special requirements of spatial light modulator technology. For example, secondary illumination altering means can be placed in the vicinity of the uniformly illuminated modulator plane 41 shown in FIG. 2. For example, there are spatial light modulators where the fill factor (ratio of the site aperture/site pitch) is significantly less than 1.0. With such low fill factor modulators, it can be advantageous to put a lenslet array immediately prior to the spatial light modulator, to focus the light onto the modulator sites, rather than having it lost on the areas outside the modulator site apertures.

There are also spatial light modulators available in the market which have dynamic diffractive structures used to alter the phase of the light. The light can be analyzed for modulation by means of a stop structure placed in a fourier plane within the print lens 50. In its simplest form, a stop structure designed to pass or reject the zero order undiffracted light may be used. As these modulators alter the angularly directionality of the incident light, the quality of the modulation is sensitive to the angular width, or NA, of the incident light. More complex stop structures, such as "picket fences" can be used to improve the contrast of the modulated light relative to the unmodulated light, if the illumination is adjusted appropriately.

Figure 4:
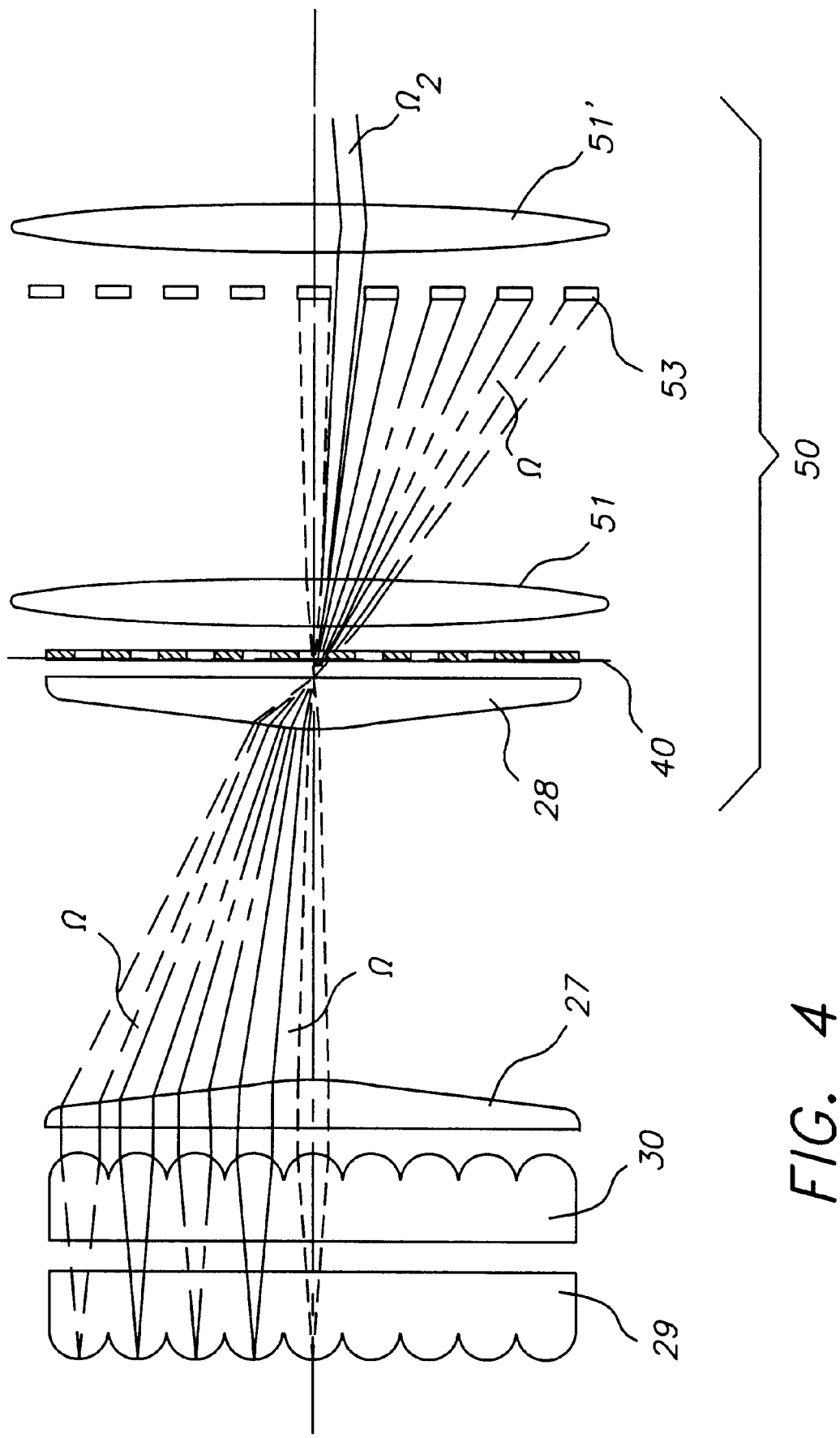
FIG. 4 is a top plan view of another embodiment of the invention with gaps in the angular spectrum.

In particular, as shown in FIG. 4, which is an alternate embodiment of the FIG. 2 system, the fly's eye integrator 23 is designed so that the lag range per pair of uniformizer lenslet array 29,30 is reduced, which causes the lenslet elements of uniformizer lenslet array 30 to be underfalled (light is only in the central portions of the elements). This can be accomplished by increasing the number of lenslet pairs. The incoming light to the modulator plane 41 then has gaps $\Omega$ in the angle space, which, when the light is unmodulated, travel through the spatial light modulator, and hit the picket fence stop structure 53. This stop structure 53 is located at a focus created by lens elements within the print lens 50, such as lens elements, 51' which act as a fourier transform lens. When a light beam is modulated, both the light and the gaps are phase shifted, causing an angular displacement at the stop 53, allowing light to be put through the transmitting areas of the stop, and onwards, and to be imaged at the media plane 60. (FIG. 4 shows a portion of the illumination to an on-axis modulator site of spatial light modulator 40 being illuminated, including the angular gaps $\Omega$, and then an exemplary angular swath of light, $\Omega_2$, being transmitted through the stop.) The stop structure 53 can be designed to block (as shown) or transmit, the unmodulated light, depending on the location of the opaque blocking elements.

Referring back to FIG. 3, another alternate embodiment of the present invention is shown in which the pre-modulator illumination system is based on a classical Koehler illumination design approach. This system also utilizes a segmented fly's eye integrator 35 together with the segmented light source, laser diode array 11. In the preferred embodiment of FIG. 2, the source (laser diode emitters 12) at plane $a_0$ is imaged indirectly, via conjugate plane $a_1$, to the object (the spatial light modulator, located at conjugate plane $a_2$), which is in turn imaged to the media plane 60. The system of FIG. 2 is principally an altered version of a classical critical illumination system. By comparison, in the system of FIG. 3, the source (laser diode emitters 12) are imaged to an intermediate plane $a_1$, which is in turn imaged to the entrance pupil of the print lens 50 (not shown). The optical system of FIG. 3 uses the laser lenslet array 31 to generate image space telecentric Koehler style illumination at the $b_0$ plane, where, in localized areas of the $b_0$ plane, each point is overlap illuminated by each source point of a given laser diode emitter 12. Thus, because of this overlap, the light profile within these localized areas is inherently more uniform than the light profiles of the emitters themselves. These localized areas of the $b_0$ plane are subsampled and re-imaged by means of the segmented fly's eye integrator 35 which consists of elements 32, 33, and 34, in overlapping fashion to the conjugate plane $b_1$, which is also the modulator plane 41, thus flood illuminating the spatial light modulator 40. The spatial light modulator is then imaged at the appropriate magnification by the print lens 50 to the media plane 60, to create a line of closely packed writing spots (not shown).

The system of FIG. 3 adapts the segmented nature of the laser diode array source advantageously, by segmenting the fly's eye integrator 35 into $N_1$ uniformizer subways 36 corresponding to the $N_1$ laser diode emitters 12 of laser diode array 11. For example in fly's eye integrator 35, uniformizer lenslet array elements 32a and 33a correspond to a given laser diode emitter 12a and laser lenslet array element 31a. Each laser lenslet array element 31 provides Koehler style illumination from the corresponding emitter, to a portion of the $b_0$ plane.

The light profile in each of these localized areas of the $b_0$ plane is broken into $N_3$ portions, where $N_3$ is the number of lenslet elements in a given uniformizer subarray 36. Each uniformizer lenslet array element 32 is magnified and overlap imaged to the $b_1$ plane by the corresponding uniformizer lenslet array element 33 and combiner field lens 34. For example, light from the center of each lenslet element 32 is imaged to the center of the modulator plane $b_1$ (also plane 41), as shown by the raypaths R, R', and R". Likewise, light from the edge of each uniformizer lenslet array element 32 goes to the edge of the illuminated area in the $b_1$ plane, as shown by raypaths S and S'. Thus, the spatial uniformity of the light at the spatial light modulator, in plane $b_1$, should be considerably improved, as it assembled from the averaging of the $N_3$ subsamples of the Koehler illuminated $b_0$ plane, for all the $N_1$ laser diode emitters.

The angular averaging of this embodiment can be somewhat compromised however. For example, in FIG. 3, where there are three uniformizer lenslet array pairs for each laser diode emitter ($N_3$=3), light that collects near the optical axis at the $b_1$ illumination plane will include some low angle light from the laser diode emitters, and predominately high angle originating light, but almost no mid-angle originating light. By comparison, light that collects near the edges of the illuminated area in the $b_1$ plane will be composed predominately of light that exited the laser diode emitters at mid-angles, with some high angle light present, and almost no low angle light present. The spatial averaging, and particularly the angular averaging, can be improved by increasing the number of lenslets, $N_3$, in each of the $N_1$ uniformizer lenslet subarrays (32,33).

As compared to the preferred embodiment of FIG. 2, the system of FIG. 3 has the advantages of requiring fewer components and providing a potentially shorter system design. But, as mentioned, the quality of the angular averaging can vary, depending on how the system is designed. However, the FIG. 3 system isn't always viable, as several $N_3$) lenslets for each uniformizer lenslet array element pair 32,33 must fit within the pitch distance of the laser diode array 11. For example, with the OPC-D020 laser, the ratio of the emitter width to the laser diode pitch is fairly small (0.23), and the absolute size of the laser diode pitch (650 $\mu$m) is large enough that multiple $N_3$) subarray uniformizer lenslets can be fit in that space. The uniformizer lenslet arrays 32,33 are also located rather close to the laser diode array, at the back focal plane of the laser lenslet array 31. This close proximity can complicate the design process for including the cross array optics.

Preferentially, the focal length of the laser lenslet array 31 is determined so as to collect the full NA from all source points on any given laser diode emitter 12. For the OPC-D020 laser, with a 0.13 NA, this focal length is 1.93 mm. For a system where each of the uniformizer subarrays 36 has $N_3$ equals three pairs of corresponding uniformizer lenslet array elements, the lenslet elements 32,33 are all 0.17 mm wide, with focal lengths of 2.15 mm. For a linear spatial light modulator 40 consisting of 256 pixels, each 60 $\mu$m wide, located at the $b_1$ plane of FIG. 3, the field lens 34 has 198 mm focal length. The resulting illumination system, from laser to modulator, is 205 mm length.

Figure 6:
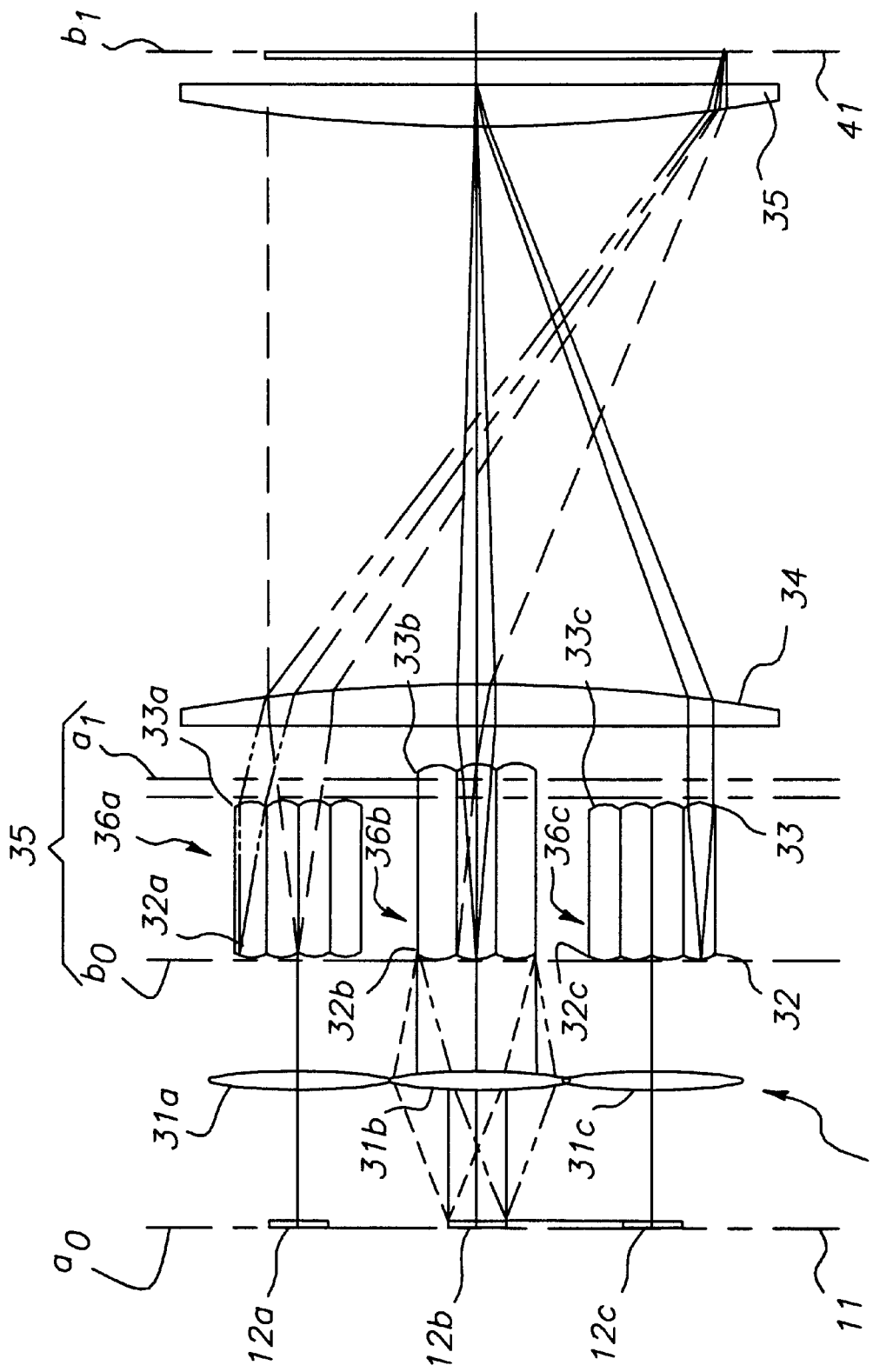
FIG. 6 is a top plan view of an additional embodiment of a laser printer according to the present invention.

Yet another way to improve the angular uniformity of the FIG. 3 system is to build a system where the number of uniformizer lenslet array elements $N_3$ in the uniformizer subarrays (36) varies from laser diode emitter to laser diode emitter. Most simply, an alternating pattern of uniformizer lenslet array element pairs per subarray can be used, such as an odd or even pattern, for example 3-4-3-4 as shown in FIG. 6. A uniformizer subarray pair (36) with an even number of lenslet elements will distribute mid-angle originating light to the center of the $b_1$ plane, and low and high angle originating light to the edges of the illuminated area in the $b_1$ plane. This balances with the angular distributions of incident light for the uniformizer subarrays with an odd number of lenslets, to give an overall illumination to the $b_1$ plane that has improved angular homogenization as well. When the uniformizer subarrays are varied in this manner, the width and focal lengths of the lenslets will vary from one subarray to another accordingly. Thus the required magnification to the $b_1$ plane will vary as well, though one field lens 34, with a unique focal length, will work with all the uniformizer subarrays 36. If the obtained uniformity is still inadequate, further integrator stages, with lenslet array element pairs and field lenses, as were used in the preferred embodiment shown in FIG. 2, can be added to the system after the $b_1$ illumination plane of FIG. 3 or FIG. 6.

Figure 7:
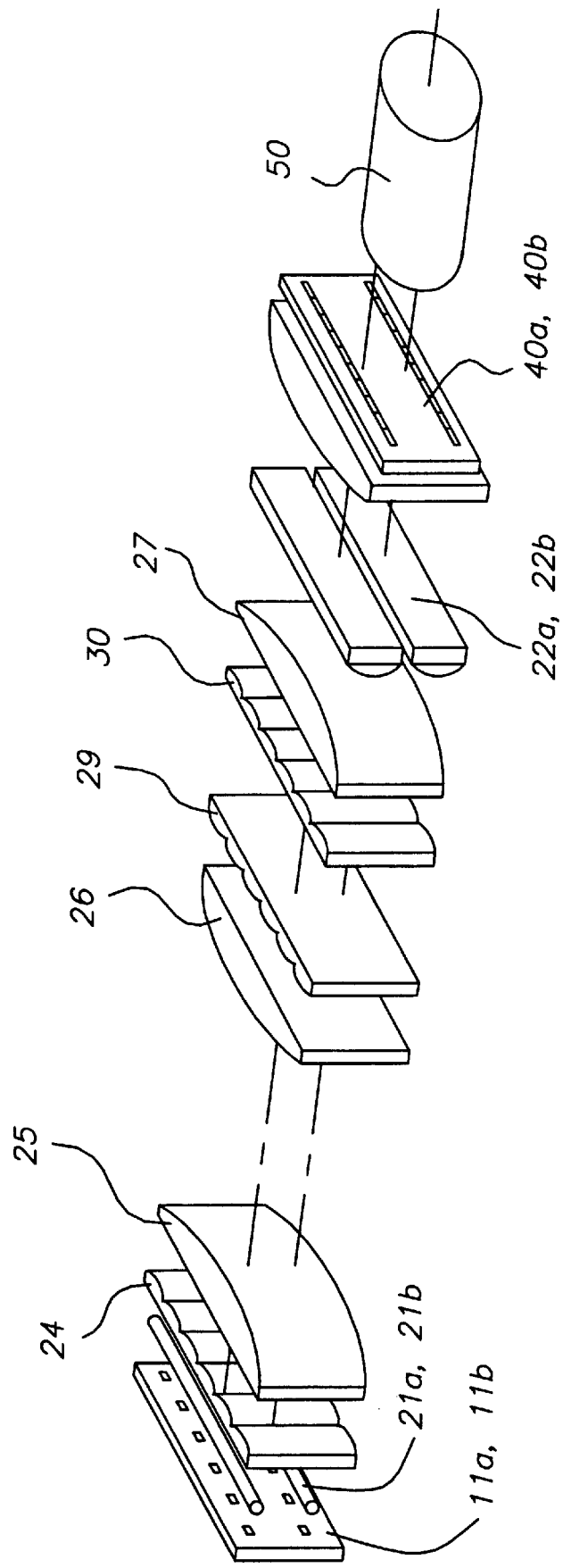
FIG. 7 is a perspective view of yet another embodiment of a laser printer according to the present invention.

The laser diode array can also consist of stack of multiple laser diode arrays, as is shown in FIG. 7 where laser diode array 11 consist of two laser arrays. In FIG. 7 each of the vertically stacked laser arrays utilize the same illumination optics (laser lenslet array, field lenses, and fly's eye uniformizer) in the array direction, but parallel sets of lens elements 21 and 22 are used in the cross array direction, so that multiple rows of pixels at the spatial light modulator are simultaneously illuminated. The array direction lens elements are shared by the multiple laser arrays to reduce the part count. However, it may be advantageous to have separate laser lenslet arrays 24 for the different laser diode arrays 11a and 11b, as the array direction alignment of the multiple laser arrays 11 in the array direction is then less critical. Multiple laser arrays 12 could also be used with multiple spatial light modulator arrays 40 with the array illumination optics duplicated in the array direction, rather than the cross array direction. The system of FIG. 7 could also be altered so that multiple laser diode arrays illuminate a single spatial light modulator, by utilizing common cross array optical elements. This has the advantage of increasing the power density on the spatial light modulator, and therefore, at the media as well, thus enabling higher productivity printing, or enabling printing with less sensitive media. However, the cross array numerical aperture is increased, which will reduce the effective depth of focus at the media, as well as increasing the size of the print lens 50.

The advance of technology may eventually make available laser diode arrays consisting of single mode emitters, with comparable power output to the current devices with multimode laser diode emitters. Such laser diode arrays would be generally advantageous because the power density and brightness would be considerably greater. As single mode laser diode emitters typically output beams with gaussian profiles, spatial homogenizing would still be required for flood illumination, as used with a spatial light modulator in a laser printer. The previously described illumination systems are adaptable to usage with a single mode diode laser array, provided that the spatial coherence of such sources doesn't cause interference effects in the illumination plane. Additional components, such as a transparent echelon might be used to break up the light from each laser diode emitter into spatially incoherent segments that can be safely overlapped, provided that the temporal coherence of the laser is short enough that the echelon can work within a practical distance. Polarization means can also be used to prevent interference effects, provided that the spatial light modulator isn't a polarization sensitive device.

This invention has been described in detail with particular reference to the preferred embodiments thereof, but it will be understood that variations and modifications can be effected within the spirit and scope of the invention. For example, other light integrator devices, such as light tunnels, could also be used under the right conditions. Also, other segmented sources, such as, a light emitting diode (LED) array, or fiber array in place of the laser diode array can be used. The laser light array from the fiber array can come either from fiber pigtailed lasers or from fiber lasers. Also, the separate cross array illuminator optics could be omitted, to be replaced by a two-dimensional integration system. In general, the goal is to reduce the residual non-uniformity to just a few percent.

Although the examples show only one fly's eye integrator, multiple fly's eye integrators could be used in this type of optical system.

| Parts List: | |
|---|---|
| 10 | ... laser printer |
| 11 | ... laser diode array |
| 12 | ... laser diode emitters |
| 12a, 12b, 12c | ... emitters |
| 13 | ... optical axis |
| 20 | ... illumination optics |
| 21 | ... fiber lens |
| 22 | ... cross array lens |
| 23 | ... fly's eye integrator |
| 24 | ... laser lenslet array |
| 24a, 24b, 24c | ... lenslet elements |
| 25 | ... combiner field lens |
| 26, 27 | ... field lenses |
| 28 | ... field lens |
| 29 | ... first uniformizer lenslet array |
| 30 | ... second uniformizer lenslet array |
| 31 | ... lenslet array |
| 31a | ... laser lenslet array element |
| 32 | ... uniformizer lenslet array elements |
| 32a, 33a | ... uniformizer lenslet array elements |
| 32, 33 | ... uniformizer lenslet array elements |
| 34 | ... field lens |
| 35 | segmented fly's eye integrator |
| 36 | uniformizer subarrays |
| 40 | ... spacial light modulator array |
| 41 | ... modulator plane |
| 50 | ... print lens |
| 51 | ... lens element |
| 53 | ... stop structure |
| 60 | ... media plane |

What is claimed is:

1. A laser printer for printing onto a light sensitive media comprising:

a laser array comprised of a plurality of laser diode emitters each of which emits a beam of light;

cross array illumination optics for reducing a divergence of light beams from the plurality of laser diode emitters;

a laser lenslet array having lenslet elements, each lenslet element of the laser lenslet array receiving a light beam from each laser diode emitter;

at least one fly's eye integrator for providing spatially and angularly homogenized uniform flood illumination of a spatial light modulator comprised of a plurality of modulator sites; and a print lens for imaging the spatial light modulator onto the light sensitive media.

2. A laser printer as in claim 1 wherein said fly's eye integrator is comprised of a first uniformizer lenslet array and a second uniformizer lenslet array.

3. A laser printer as in claim 2 wherein a field lens is located between said fly's eye integrator and said laser lenslet array.

4. A laser printer as in claim 2 wherein a field lens is located between said fly's eye integrator and said spatial light modulator.

5. A laser printer as in claim 1 wherein said fly's eye integrator is divided into segments, each segment having an array of lens elements patterned on a first surface and a corresponding array of lens elements patterned on a second surface, and each segment corresponds to a laser diode emitter and a lenslet element.

6. A laser printer as in claim 5 wherein said first surface has a first number of facets and said second surface has a second number of facets and said first number and said second number are equal.

7. A laser printer as in claim 5 wherein said laser lenslet array provides Koehler illumination to said fly's eye integrator.

8. A laser printer as in claim 5 wherein a first group of segments has an even number of lens elements on said first and second surfaces and a second group of segments has an odd number of lens elements on said first and second surfaces.

9. A laser printer as in claim 8 wherein said group one segments alternate with group two segments.

10. An illumination system comprising:

a laser array comprised of a plurality of laser diode emitters each of which emits a beam of light;

cross array illumination optics for reducing a divergence of light beams from the plurality of laser diode emitters;

a laser lenslet array having lenslet elements, each lenslet element of the laser lenslet array receiving a light beam from each laser diode emitter; and at least one fly's eye integrator for providing spatially and angularly homogenized uniform flood illumination of a plane.

11. An illumination system as in claim 10 wherein a spatial light modulator is located at said plane.

12. A printer for printing onto a light sensitive media comprising:

a LED array comprised of a plurality of LED emitters each of which emits a beam of light;

a lenslet array having lenslet elements, each lenslet element of the lenslet array receiving a light beam from each LED emitter;

a fly's eye integrator for providing spatially and angularly homogenized uniform flood illumination of a spatial light modulator comprised of a plurality of modulator sites; and a print lens for imaging the spatial light modulator onto the light sensitive media.

13. A laser printer for printing onto a light sensitive media comprising:

- a laser array comprised of a plurality of laser diode emitters each of which emits a beam of light;
- a laser lenslet array having lenslet elements, each lenslet element of the laser lenslet array receiving a light beam from each laser diode emitter;
- a fly's eye integrator for providing spatially and angularly homogenized uniform flood illumination of a spatial light modulator comprised of a plurality of modulator sites; and
- a print lens for imaging the spatial light modulator onto the light sensitive media.

14. A laser printer for printing onto a light sensitive media comprising:

- a laser array comprised of a plurality of laser diode emitters each of which emits a beam of light;
- cross array illumination optics for reducing a divergence of light beams from the plurality of lasers diode emitters;
- a laser lenslet array having lenslet elements, each lenslet element of the laser lenslet array receiving a light beam from each laser diode emitter;
- a fly's eye integrator for providing spatially and angularly homogenized uniform flood illumination of a spatial light modulator comprised of a plurality of modulator sites wherein said fly's eye integrator is divided into segments, each segment having an array of lens elements patterned on a first surface and a corresponding array of lens elements patterned on a second surface; and
- a print lens for imaging the spatial light modulator onto the light sensitive media.

15. A laser printer as in claim 14 wherein a field lens is located between said fly's eye integrator and said spatial light modulator.

16. A laser printer for printing onto a light sensitive media comprising:

- a multitude of laser diode arrays comprised of a plurality of laser diode emitters each of which emits a beam of light;
- cross array illumination optics for reducing a divergence of light beams from the plurality of laser diode emitters;
- a laser lenslet array having lenslet elements, each lenslet element of the laser lenslet array receiving a light beam from each laser diode emitter;
- a fly's eye integrator for providing spatially and angularly homogenized uniform flood illumination of at least one spatial light modulator comprised of a plurality of modulator sites; and
- a print lens for imaging the spatial light modulator onto the light sensitive media.

17. A laser printer for printing onto a light sensitive media comprising:

- a first laser diode array comprised of a plurality of laser diode emitters each of which emits a beam of light;
- a second laser diode array comprised of a plurality of laser diode emitters each of which emits a beam of light;
- cross array illumination optics for reducing a divergence of light beams from the plurality of laser diode emitters;
- a laser lenslet array having lenslet elements, each lenslet element of the laser lenslet array receiving a light beam from one laser diode emitter in said first laser diode array and one laser diode emitter in said second laser diode array;
- a fly's eye integrator for providing spatially and angularly homogenized uniform flood illumination of a first and second spatial light modulator, each comprised of a plurality of modulator sites, wherein said first spatial light modulator is illuminated primarily by said first laser diode array and said second spatial light modulator is illuminated primarily by said second laser diode array; and
- a print lens for imaging the spatial light modulators onto the light sensitive media.

* * * * *